B. W. WEBER.
HAY FORK.
APPLICATION FILED DEC. 27, 1912.
1,091,408.
Patented Mar. 24, 1914.
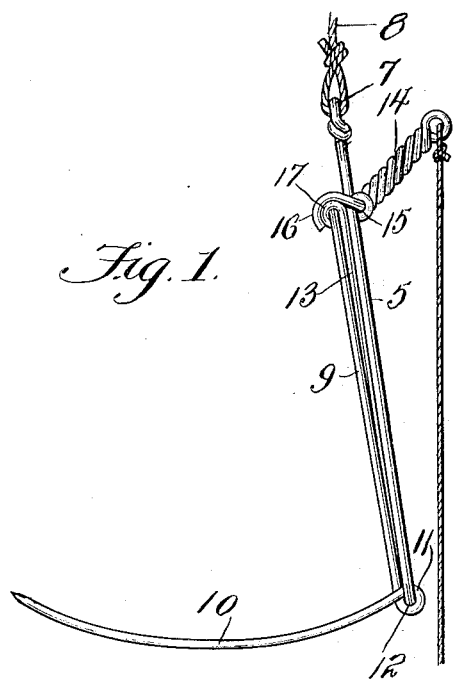
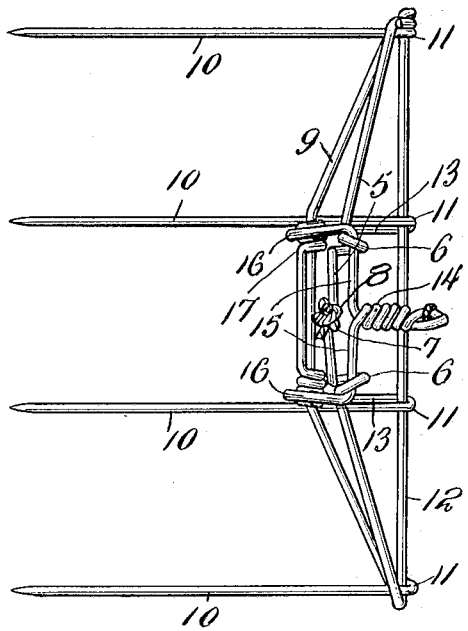
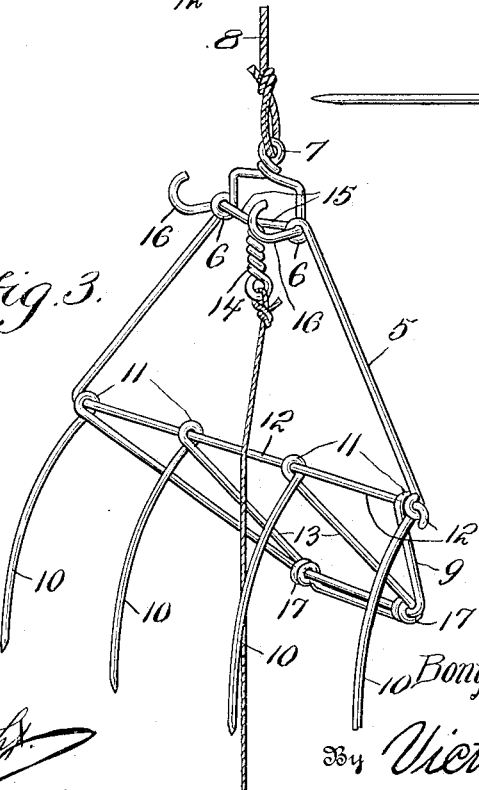
Inventor
Boniface W. Weber
By Victor J. Evans,
Attorney
Witnesses

UNITED STATES PATENT OFFICE.

BONIFACE W. WEBER, OF YOCEMENTO, KANSAS.

HAY-FORK.

1,091,408.  Specification of Letters Patent. Patented Mar. 24, 1914.

Application filed December 27, 1912.  Serial No. 738,892.

*To all whom it may concern:*

Be it known that I, BONIFACE W. WEBER, a citizen of the United States, residing at Yocemento, in the county of Ellis and State of Kansas, have invented new and useful Improvements in Hay-Forks, of which the following is a specification.

The invention relates to forks and more particularly to the class of sling forks.

The primary object of the invention is the provision of a fork of this character wherein a load of hay, straw or other material may be gathered and housed from the predetermined level and thereafter discharge it without requiring the manual handling of the fork or the use of a hand fork.

Another object of the invention is the provision of a fork wherein its load can be readily and easily dumped when elevated to the desired point and also which will enable a load to be gathered without excessive labor on the part of the operator of the fork.

A further object of the invention is the provision of a fork of this character which is simple in construction, strong, durable, thoroughly reliable and efficient in its purpose and inexpensive in manufacture.

With these and other objects in view the invention consists in the construction, combination and arrangement of parts as will be hereinafter more fully described, illustrated in the accompanying drawings and pointed out in the claim hereunto appended.
In the drawings:—Figure 1 is a side elevation of a rake constructed in accordance with the invention. Fig. 2 is a top plan view thereof. Fig. 3 is a perspective view of the rake showing the same in dumping position.

Similar reference characters indicate corresponding parts throughout the several views in the drawings.

Referring to the drawings by numerals the fork comprises a substantially triangular shaped frame 5 which is preferably formed from a single piece of wire, the ends thereof being joined in any suitable manner while formed in the said wire are alining eyes 6
in which is swingingly supported a release connection presently described. The frame 5 at a point medially between the eye 6 is further bent to provide a hanger loop or eye 7 in which is fastened a hoisting or suspension cable 8 whereby the frame may be raised and lowered when required. Swingingly connected to the frame 5 is a fork head 9 provided with tines 10 the same arranged in spaced relation to each other and are integrally formed with the head 9 which latter is provided at the point of juncture of the tines 10 therewith with bearing eyes 11 which loosely embrace the lower portion 12 of the frame 5 for the dumping of the load or the swinging of the head 9 and its tines 10 to the position shown in Fig. 3 of the drawings.

The head 9 is of substantially corresponding shape with respect to the frame 5 and is formed with intermediate braces 13, the head is adapted to be locked to the frame so as to prevent the dumping of the load when the rake is elevated for the lifting of the load to a predetermined height, the said head being locked in a manner presently described. The releasing connection is formed from a single wire bent to provide a lever 14 and pintle branches 15 which are loosely engaged in the eyes 7 and terminate in hook like latch terminals 16 adapted to engage the portions 17 of the rake head 9 for the locking of the latter in parallel relation to the frame whereby the tines 10 will extend at an angle therefrom for retaining a load thereon. Connected with the lever 14 is a pull cable 18 which when pulled upon will disengage the latch terminal 16 from the head 9 thus permitting the dumping of the load as will be clearly obvious.

What is claimed is:—

A rake of the class described comprising a closed substantially triangular shaped frame formed with spaced alining eyes near one corner thereof and also formed with an intermediate eye, a plurality of tines swingingly connected to the said frame, connecting pieces uniting pairs of the said tines, one of said pieces being formed with eyes encircling the other connecting piece for joining the tines, a hook member pivoted in said alining eyes of the frame and engageable with the connecting portions of the tines for holding the latter in non-dumping position, and a suspension cable connected with the intermediate eye of the frame.

In testimony whereof I affix my signature in presence of two witnesses.

BONIFACE W. WEBER.

Witnesses:
W. H. EARLY,
FRED. MILLER.

Copies of this patent may be obtained for five cents each, by addressing the "Commissioner of Patents, Washington, D. C."